US008842632B2

(12) United States Patent
Zou

(10) Patent No.: US 8,842,632 B2
(45) Date of Patent: Sep. 23, 2014

(54) PRE-REGISTRATION, STORING OF PRE-REGISTRATION SESSION INFORMATION AND SESSION TRANSFER IN A WIRELESS COMMUNICATION SYSTEM

(75) Inventor: Jialin Zou, Randolph, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 1249 days.

(21) Appl. No.: 12/071,010

(22) Filed: Feb. 14, 2008

(65) Prior Publication Data

US 2009/0207805 A1    Aug. 20, 2009

(51) Int. Cl.
*H04W 80/04* (2009.01)
*H04W 60/04* (2009.01)
*H04W 36/30* (2009.01)
*H04W 36/18* (2009.01)
*H04W 76/00* (2009.01)

(52) U.S. Cl.
CPC .................................. *H04W 60/04* (2013.01); *H04W 76/00* (2013.01)
USPC ............................. 370/331; 455/436; 455/442

(58) Field of Classification Search
USPC .................. 370/331; 455/67.11, 423, 442
See application file for complete search history.

(56) References Cited

U.S. PATENT DOCUMENTS

| 7,272,123 | B2 * | 9/2007 | Wall ............................... 370/331 |
| 8,009,612 | B2 * | 8/2011 | Cherian et al. ................ 370/328 |
| 2002/0141360 | A1 * | 10/2002 | Baba et al. .................... 370/331 |
| 2003/0177283 | A1 * | 9/2003 | Hamilton et al. ............. 709/328 |
| 2004/0127220 | A1 * | 7/2004 | Proctor, Jr. .................... 455/442 |
| 2005/0163078 | A1 * | 7/2005 | Oba et al. ...................... 370/331 |
| 2006/0009158 | A1 * | 1/2006 | Bernhard et al. .......... 455/67.11 |
| 2006/0109817 | A1 * | 5/2006 | Ramanna et al. ............. 370/331 |
| 2008/0089293 | A1 * | 4/2008 | Madour et al. ................ 370/331 |
| 2008/0259869 | A1 * | 10/2008 | Wang et al. .................... 370/331 |
| 2009/0022104 | A1 * | 1/2009 | Cherian et al. ................ 370/331 |

* cited by examiner

*Primary Examiner* — Helal A Algahaim
*Assistant Examiner* — Mahmoud Ismail
(74) *Attorney, Agent, or Firm* — Harness, Dickey & Pierce

(57) ABSTRACT

Example embodiments are directed to a system and methods of pre-registration, storing of pre-registered session information and session transfer, which may occur when an access terminal is in close proximity to a border area between a first radio access technology (RAT) area and a second RAT area. A method includes obtaining pre-registration session information if an access terminal enters a pre-registration zone, starting a pre-registration session information timer associated with the obtained pre-registration session information, and storing the obtained pre-registration session information until the associated pre-registration information timer expires. Further, both an access terminal and an access network include one or more memories configured to store more than one group of pre-registration session information and more than one timer. Each of the timers are associated with a corresponding set of pre-registration session information.

21 Claims, 8 Drawing Sheets

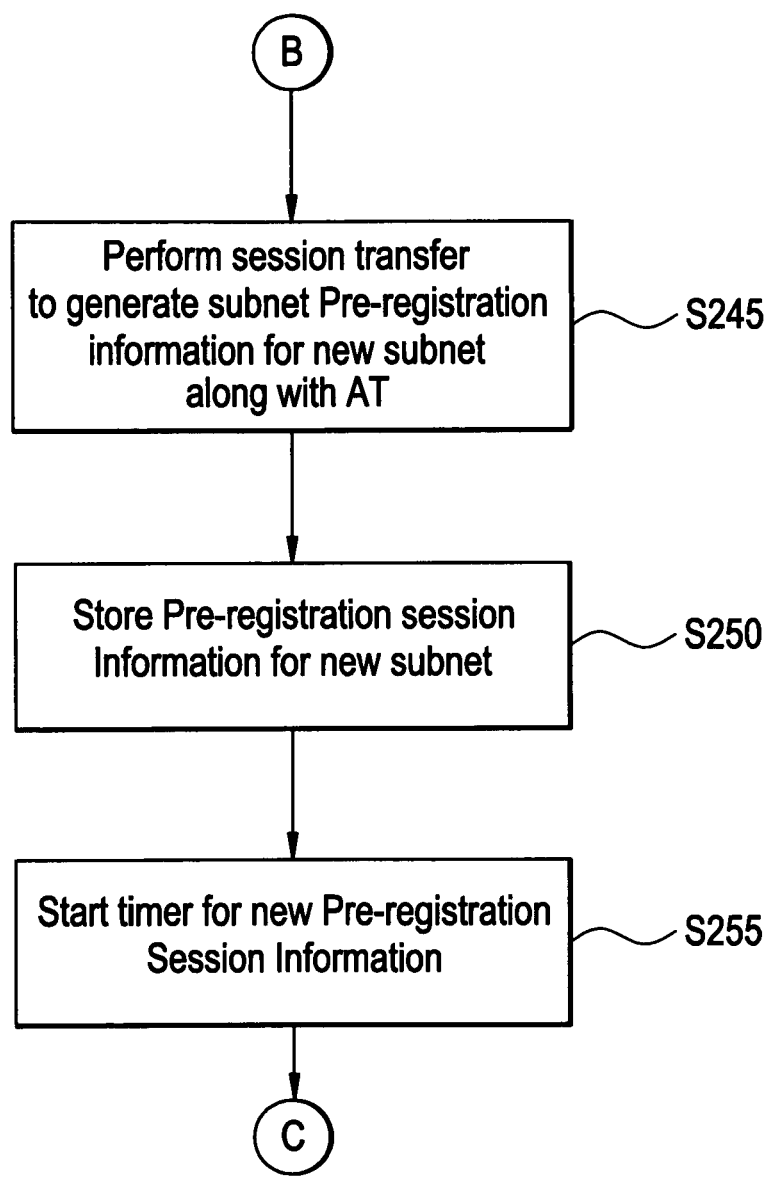

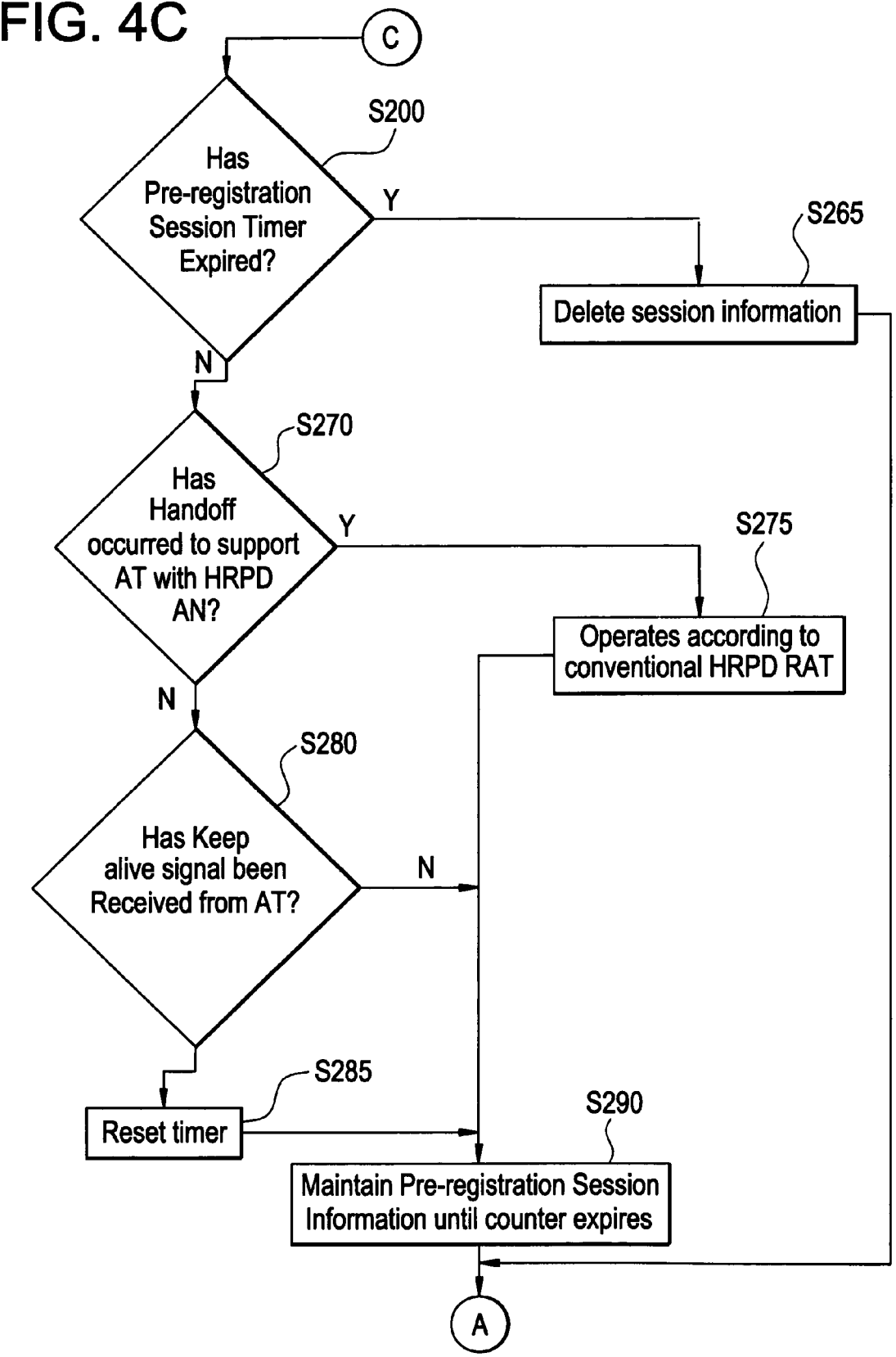

PRE-REGISTRATION, STORING OF PRE-REGISTRATION SESSION INFORMATION AND SESSION TRANSFER IN A WIRELESS COMMUNICATION SYSTEM

BACKGROUND

1. Field of the Invention

Example embodiments of the present application relate to a system and method for telecommunications. More particularly, example embodiments are directed to system and methods of pre-registration, storing of pre-registered session information and session transfer, which may occur when an access terminal is in close proximity to a border area between a first radio access technology (RAT) area and a second RAT area.

2. Background Information

If an access terminal is capable of communicating using more than one RAT, the access terminal may travel across a border between a first coverage area operating according to a first RAT and a second coverage area operating according to a second RAT.

Examples of the Radio Access Technologies (RATs) are CDMA 2000 3G1X, High Rate Packet Data (HRPD), Long Term Evolution (LTE), Worldwide Interoperability for Microwave Access (WiMAX), ultra mobile broadband (UMB), etc.

When the access terminal reaches the border area and crosses the border area into a new RAT, a hand-off is conducted. Prior to the hand-off, in a pre-registration zone located between a first coverage area having a first RAT and a second coverage area having a second RAT, a pre-registration or re-registration is performed between the access terminal and an access network in order to ensure hand-off can take place in a suitable and timely manner so that wireless communication services for the access terminal is not interrupted. The pre-registration and re-registration generates pre-registration and re-registration session information, respectively. Conventionally, if the access terminal exits the pre-registration zone, the pre-registration and/or re-registration session information is deleted within the access terminal and the access network.

FIG. 1 illustrates a wireless communication system. In particular, the left hand side of FIG. 1 illustrates a long term evolution (LTE) coverage area and the right hand side of FIG. 1 illustrates a high rate packet data (HRPD) coverage area. Further, FIG. 1 illustrates a border area (i.e., a pre-registration zone) located in between the LTE coverage area and the HRPD coverage area. This border area is an area in which an access terminal (AT) may be triggered to perform a pre-registration process. A conventional pre-registration process includes the initial session registration (e.g. UATI request/assign in HRPD), radio connection set up (e.g. connection request and traffic channel assignment in HRPD), and session negotiation (e.g. radio link parameter negotiations and upper layer signaling and negotiations).

Still further, FIG. 1 illustrates that the HRPD coverage area includes a first subnet Subnet 1 and a second subnet Subnet 2. Accordingly, the pre-registration zone is divided into a first subnet pre-registration zone and a second subnet pre-registration zone. Lastly, FIG. 1 illustrates an example path that an access terminal AT may follow. This path is illustrated in FIG. 1 as including four points of interest identified as A, B, C, and D.

One skilled in the art will appreciate that the LTE coverage area, pre-registration zone and HRPD coverage area of the wireless system illustrated in FIG. 1 include a plurality of cells, and each of the plurality of cells may be covered by one or more RATs. For example, the cells of the LTE coverage area are supported by one or more access networks operating consistent with the LTE RAT, and the cells of the HRPD coverage area are supported by one or more access networks operating according to an HRPD RAT. Further, the cells within the pre-registration zone are supported by one or more networks operating consistent with the LTE RAT and possibly one or more networks operating consistent with the HRPD RAT.

Referring to FIG. 1, if the access terminal AT is at an edge of the LTE coverage area, one or more access networks may indicate to the access terminal that a current sector is a non-interference-limited border by providing a border indication broadcast by one or more access networks. In response to this border indication, the access terminal becomes aware of entering the border area, referred to hereinafter as the pre-registration zone.

If the access terminal enters the pre-registration zone, the access terminal may be triggered to perform pre-registration. Generally, pre-registration involves negotiating a pre-registration session at the target network of different RAT through a current serving technology air interface. In the example illustrated in FIG. 1, the pre-registration involves negotiating a pre-registration session with a HRPD access network (AN) of the HRPD coverage area using a technology air interface of the LTE coverage area.

Still referring to FIG. 1, at point A along the access terminal path, the access terminal receives a border indication broadcast from one or more LTE access networks and/or one or more HRPD access networks. In response to this indication, the access terminal begins a pre-registration process.

Pre-registration is generally required before a handoff can take place between the LTE coverage area and the HRPD coverage area. The handoff will take place once the access terminal crosses the LTE/HRPD coverage boundary indicated in FIG. 1 and enters the second subnet Subnet 2 of the HRPD coverage area. Once this idle handoff takes place, the access terminal is supported by one or more HRPD access networks of the HRPD coverage area.

Still referring to FIG. 1, the access terminal then crosses back into the pre-registration zone. In particular, the access terminal AT reenters the second subnet of the pre-registration zone. Still following the access terminal path, the access terminal exits the pre-registration zone and reenters the LTE coverage area. Because this application is concerned primarily with the transition from the LTE coverage area to the HRPD coverage area, details regarding the access terminal transitioning from the HRPD coverage area back into the LTE coverage area is omitted herein for the sake of brevity.

Further, the access terminal then reenters the second subnet of the pre-registration zone at point B of the access terminal path. According to conventional pre-registration techniques, at point B, the access terminal AT will again pre-register with the HRPD coverage area. This second pre-registration may be referred to as a re-registration. This second pre-registration or re-registration is necessary according to conventional techniques because the information related to the first pre-registration is deleted from both the access terminal and the access networks of the LTE coverage area and the HRPD coverage area. One skilled in the art will appreciate that each pre-registration requires time and resources. For example, each pre-registration requires enablement of a traffic channel at the Evolved Universal Terrestrial Radio Access Network (E-UTRAN) and partial or full session negotiations through an air interface of the E-UTRAN.

Still following the access terminal path of FIG. 1, the access terminal then transitions from the second subnet of the pre-registration zone into the first subnet of the pre-registration zone at point C. This transition requires a session transfer from the second target subnet of the different RAT to the first target subnet of the different RAT. The access terminal then reenters the LTE coverage area as illustrated in FIG. 1. Lastly, the access terminal AT again reenters the first subnet of the pre-registration zone at point D and thus, must again pre-register or re-register with the HRPD coverage network according to conventional practice. In addition, if the access terminal is ping-ponging at the border of different pre-registration zones, excessive session transfer requests will be sent at the air interface to occupy a large amount of radio resources and the excessive session transfer between different subnets will also create a large amount of unnecessary backhaul traffic.

As detailed above, according to conventional practices and/or a straight forward approach, a conventional access terminal following the path illustrated in FIG. 1 must perform pre-registration three different times, i.e., at points A, B and D. Each of these pre-registrations requires time and network resources.

SUMMARY

Example embodiments of the present application are directed to an access terminal, access networks, systems and related methods of pre-registration, storing of pre-registered session information and session transfer, which may occur when an access terminal is in close proximity to a border area between a first radio access technology (RAT) area and a second RAT area. Example embodiments of the present application may reduce and/or avoid unnecessary pre-registration process and session transfers as compared with conventional practices.

An example embodiment of the present application provides a wireless communication method. The wireless communication method includes obtaining pre-registration session information if an access terminal in a first coverage area moves into a portion of the first coverage area defined as a pre-registration zone for a second coverage area. The second coverage area borders the first coverage area. The method further includes starting a pre-registration session information timer associated with the obtained pre-registration session information and storing the obtained pre-registration session information until the associated pre-registration session information timer expires.

According to an example embodiment, the method may further include deleting pre-registration session information if the pre-registration information timer associated with the obtained pre-registration information expires.

According to an example embodiment, the method may further include receiving a border indicator from an access network indicating the access terminal has entered the pre-registration zone and determining if previously stored pre-registration session information is available in the access terminal. Further, the obtaining pre-registration session information may include reusing previously stored pre-registration session information to communicate with the access network if the previous pre-registration session information is available, and pre-registering with the access network to negotiate the pre-registration session information if the previously stored pre-registration session information is not available.

According to an example embodiment, the method may further include sending a session transfer request to an access network indicating the access terminal is moving into the pre-registration of a second subnet of the second coverage area when there is only the pre-registered information with a first subnet of the access network, converting the obtained pre-registration session information associated with the first subnet to pre-registration session information associated with the second subnet, and starting a new pre-registration information timer associated with the pre-registration session information associated with the second subnet.

According to an example embodiment, the method may further include transmitting a keep alive signal to an access network if the access terminal stays in the pre-registration zone for a predetermined time duration, and re-starting the pre-registration session information timer each time a keep alive signal is transmitted to the access network.

According to an example embodiment, the method may further include receiving a request from the access terminal requesting pre-registration session information for the second coverage area, and determining if the request is a session transfer request. Obtaining the pre-registration information may include converting previously-stored pre-registration session information associated with a first subnet to pre-registration session information associated with a second subnet and starting a new timer associated with the pre-registration information associated with the second subnet if the request is a session transfer request. Further, obtaining the pre-registration information may include pre-registering the access terminal to negotiate the pre-registration session information if the request is not a session transfer request.

According to an example embodiment, the method may further include receiving a keep alive signal from the access terminal, re-starting the pre-registration session information timer each time a keep alive signal is received from the access terminal.

According to an example embodiment at least a portion of signaling and messaging exchanges between an access network of the second coverage area and the access terminal are tunneled through the RAT of the first coverage area.

An example embodiment of the present application provides an access terminal. The access terminal includes a transceiver configured to communicate with a first access network of a first coverage area having a first technology type and a second access network of a second coverage area having a second technology type, a controller configured to control operations of the access terminal, and a memory configured to store a plurality of pre-registration session information and a plurality of timers. Each of the plurality of timers are associated with a corresponding one of the plurality of pre-registration session information stored in the memory, and each of the pre-registration session information includes information for communicating with the second access network prior to a possible handoff from the first access network to the second access network.

According to an example embodiment, the controller of the access terminal obtains pre-registration session information if the receiver receives broadcast information including a border indicator, starts the timer associated with the obtained pre-registration session information, and instructs the memory to store the obtained pre-registration session information until the timer expires.

According to an example embodiment, the controller of the access terminal converts previously-stored pre-registration session information associated with a first subnet of the second coverage area to pre-registration session information of a second subnet of the second coverage area in response to the receiver receiving a different subnet indicator indicating the access terminal is moving from a first subnet into a second subnet, and starts a timer associated with the pre-registration session information associated with the converted pre-registration session information.

According to an example embodiment, the controller of the access terminal deletes pre-registration session information if a corresponding timer expires.

According to an example embodiment, the controller of the access terminal instructs the transceiver to transmit a keep alive signal to the second access network if the access terminal stays in a pre-registration zone for the second coverage area for a time duration. The pre-registration zone for the second coverage area is a portion of the first coverage area bordering a border of the first coverage area and the second coverage area. The controller also re-starts the timer associated with pre-registration session information currently being used by the access terminal to communicate with the second access network.

According to an example embodiment, the memory of the access terminal stores a predefined number of the plurality of pre-registered session information, and if the number is exceeded, an oldest of the plurality of pre-registration session information and corresponding timer is replaced with a newly transferred or negotiated plurality of pre-registration session information and newly started timer corresponding to the newly transferred or negotiated plurality of pre-registration information.

According to an example embodiment, at least a portion of signaling and messaging exchanges between the second access network of the second coverage area and the transceiver of the access terminal are tunneled through a radio access technology of the first coverage area.

An example embodiment provides an access network. The access network includes a transceiver configured to communication with at least one access terminal, a controller configured to control operation of the access network, and at least one memory configured to store a plurality of pre-registration session information associated with an access terminal and a plurality of timers. Each of the plurality of timers are associated with a corresponding one of the plurality of pre-registration session information stored in the at least one memory, and each of the plurality of pre-registration session information includes information for communicating with the access terminal prior to handoff of the access terminal to the access network.

According to an example embodiment, the transceiver receives a request from the access terminal, and the controller obtains pre-registration session information for the access terminal, and starts a timer associated with the obtained pre-registration session information.

According to an example embodiment, the controller of the access network determines if a received request is a session transfer request, and obtains the pre-registration session information by converting and transferring previous pre-registration session information residing at a first subnet to a second subnet and starts a new timer associated with the converted and transferred pre-registration information associated with the second subnet if the request is determined to be a session transfer request. Further, the controller of the access network pre-registers the access terminal to negotiate the pre-registration session information if the request is determined not to be a session transfer request.

According to an example embodiment, the controller instructs the at least one memory to delete pre-registration session information if the corresponding timer expires.

According to an example embodiment, the controller of the access network restarts the timer associated with the obtained pre-registration information currently being used to communicate with the access terminal in response to the transceiver receiving a keep alive signal from the access terminal.

BRIEF DESCRIPTION OF THE DRAWINGS

The above and other features and advantages of example embodiments will become more apparent by reviewing the following detailed description of example embodiments of this disclosure with reference to the attached drawings in which:

FIGS. 4A-4C illustrate a method performed by an access network according to an example embodiment of the present application.

DETAILED DESCRIPTION OF EXAMPLE EMBODIMENTS

Figure 1:
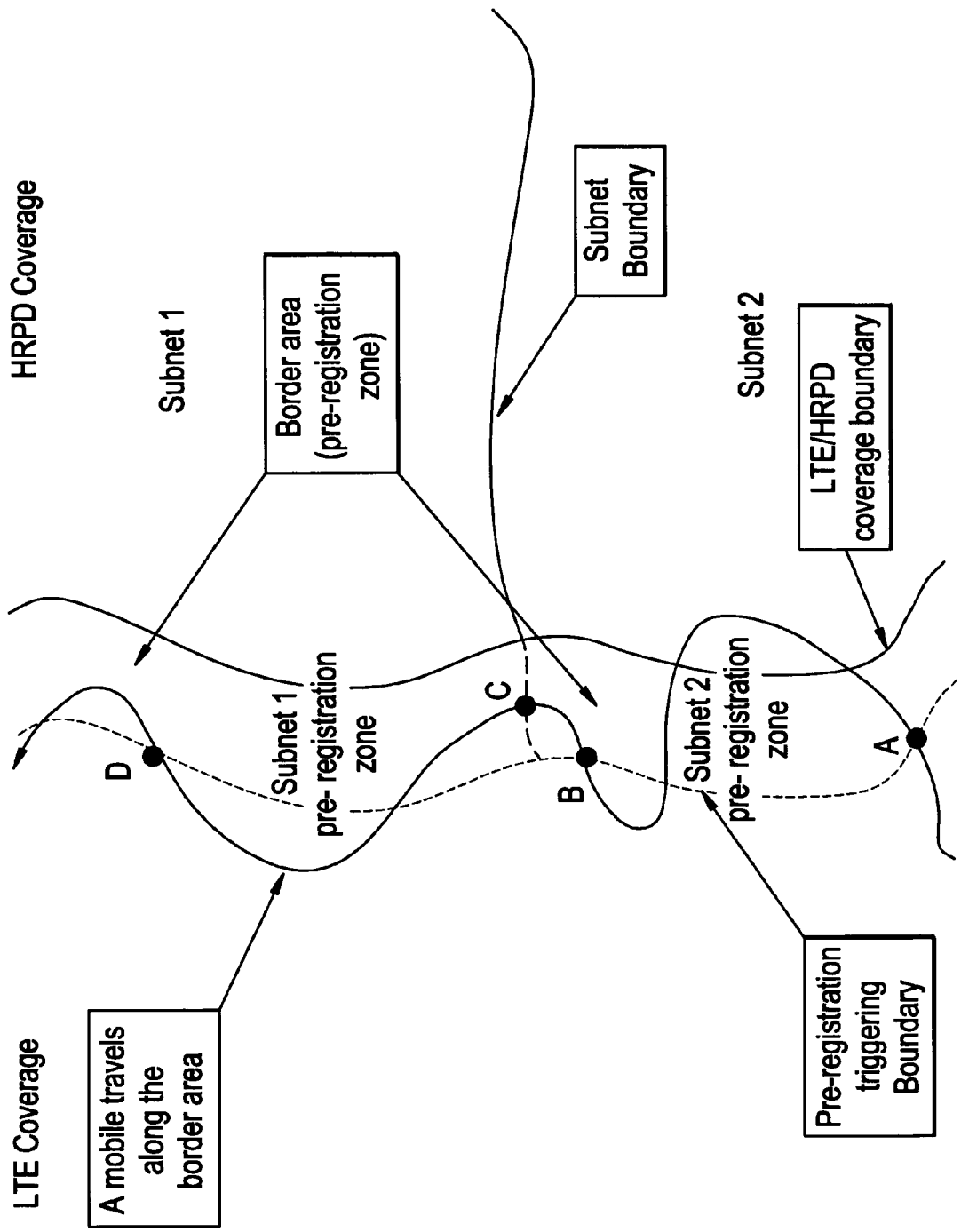
FIG. 1 illustrates a wireless communication system including a first coverage area, a second coverage area, a pre-registration zone and an example path traveled by an access terminal.

In the following description, for purposes of explanation and not limitation, specific details are set forth such as particular architectures, interfaces, techniques, etc., in order to provide a thorough understanding of example embodiments. However, it will be apparent to those skilled in the art that example embodiments may be practiced in other illustrative embodiments that depart from these specific details. In some instances, detailed descriptions of well-known devices, circuits, and methods are omitted so as not to obscure the description of example embodiments with unnecessary detail. All principles, aspects, and embodiments, as well as specific examples thereof, are intended to encompass both structural and functional equivalents thereof. Additionally, it is intended that such equivalents include both currently known equivalents as well as equivalents developed in the future.

Example embodiments are discussed herein as being implemented in a suitable computing environment. Although not required, example embodiments will be described in the general context of computer-executable instructions, such as program modules or functional processes, being executed by one or more computer processors or CPUs. Generally, program modules or functional processes include routines, programs, objects, components, data structures, etc. that perform particular tasks or implement particular abstract data types. The program modules and functional processes discussed herein may be implemented using existing hardware in existing communication networks. For example, program modules and functional processes discussed herein may be implemented using existing hardware at existing radio network control nodes.

In the following description, illustrative embodiments will be described with reference to acts and symbolic representations of operations (e.g., in the form of flow charts) that are performed by one or more processors, unless indicated otherwise. As such, it will be understood that such acts and operations, which are at times referred to as being computer-executed, include the manipulation by the processor of electrical signals representing data in a structured form. This manipulation transforms the data or maintains it at locations in the memory system of the computer, access terminal and/or access network, which reconfigures or otherwise alters the operation of the computer, access terminal and/or access network in a manner well understood by those skilled in the art.

Example embodiments are directed to systems and methods of pre-registration, storing pre-registration session information and session transfer, which may occur when an access terminal is in close proximity to or within a border area between a first RAT coverage area and a second RAT coverage area. In particular, the example embodiments described below reduce and/or avoid unnecessary pre-registrations, re-registrations and session transfers between the first RAT coverage area and a second RAT coverage area. In the example embodiments described below, the first RAT coverage area is an LTE coverage area and the second RAT coverage area is a HRPD coverage area.

Figure 2:
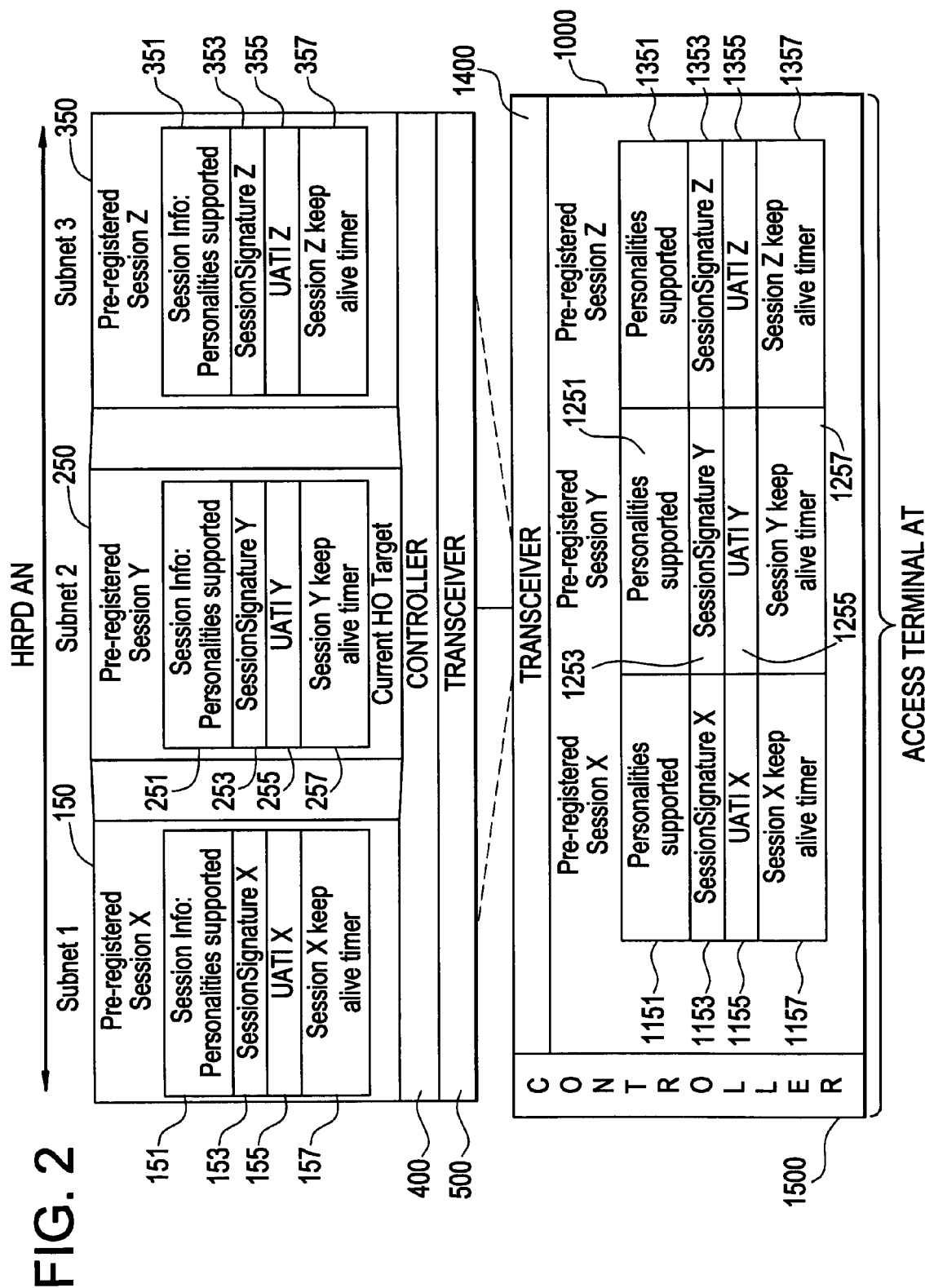
FIG. 2 illustrates an example embodiment of an access terminal and an example embodiment of an access network.

As shown in FIG. 2, an access terminal AT includes a memory 1000, a transceiver 1400 and a controller 1500. The memory 1000 stores and maintains multiple pre-registered sessions. In FIG. 2, pre-registered sessions are indicated as pre-registered session X, pre-registered session Y and pre-registered session Z. One skilled in the art will appreciate that the number and information stored in the pre-registered sessions illustrated in the example of FIG. 2 are not intended to be limiting in that the information included in the pre-registered sessions may vary, the number of pre-registered sessions may vary, and data compression of the pre-registered sessions may vary. Pre-registered session X of FIG. 2 includes information related to personalities supported 1151, session signature X 1153, a Unicast Access Terminal Identifier (UATI) UATI X 1155, and a session X keep alive timer 1157. Similarly, pre-registered session Y includes information of personalities supported 1251, session signature Y 1253, UATI Y 1255, and session Y keep alive timer 1257. Likewise, pre-registered session Z includes information of personalities supported 1351, a session signature Z 1353, UATI Z 1355 and session Z keep alive timer 1357. The information related to personalities supported in each of the pre-registered sessions relates to the configurations associated with different releases or subtypes of the RAT standard. The session signatures for each of the pre-registered sessions are the identifier of the characteristics of the session (e.g. which personality is in use with the session). The UATI of each of the pre-registered sessions is the universal access terminal identifier. The session keep-alive timer of each of the pre-registered sessions is a timer related to each of the pre-registered sessions, which controls how long the information for each of these pre-registered sessions is maintained in the access terminal AT and the associated target AN. Specifics of the keep alive timers will be described in greater detail later with respect to the flow chart of FIGS. 3A-3C.

Still referring to FIG. 2, each HRPD access network (HRPD AN) may include a plurality of subnets. The HRPD access network HRPD AN shown in FIG. 2 includes three subnets Subnet 1, Subnet 2 and Subnet 3. In FIG. 2, the HRPD AN includes memory for storing pre-registered session information. In particular, the HRPD AN of FIG. 2 includes a memory 150 storing a pre-registered session X information relating to a first subnet Subnet 1, a memory 250 storing pre-registered session Y information relating to a second subnet Subnet 2, and a memory 350 storing pre-registered session Z relating to a third subnet Subnet 3. As shown in FIG. 2, the pre-registered session information stored in memory 150 corresponds to the information of pre-registered session X stored in the memory 1000 of the access terminal AT. Similarly, the pre-registered session information stored in memory 250 of the HRPD AN corresponds to the pre-registered session Y information stored in memory 1000 of access terminal AT, and the pre-registered session information of pre-registered session Z stored in the memory 350 of the HRPD AN corresponds to the pre-registered session Z stored in the memory 1000 of the access terminal AT.

In addition to the memories 150, 250 and 350, the example embodiment of the HRPD AN shown in FIG. 2 includes a controller 400 and transceiver 500. One skilled in the art will appreciate the more than one set of pre-registration session information can be stored in each of the memories 150, 250 and 350, and that more than one set of pre-registered session information may be and likely is stored for each subnet. Further, one skilled in the art will appreciate that while the HRPD AN shown in FIG. 2 includes a single controller 400 and single transceiver 500 that more than one controller and/or receiver may be included in the HRPD AN. For example, each different subnet may a controller and transceiver associated with the respective subnets.

Example embodiments of a HRPD AN stores information for a plurality of pre-registered sessions for one or more access terminal ATs. Likewise, example embodiments of access terminals store session information for a plurality of pre-registered sessions. The above described configuration of an access terminal AT and HRPD AN of example embodiments provide various advantages, some of which are detailed below by referring back to the access terminal path previously described with respect to FIG. 1 in the flow chart of FIGS. 3A-3C describing operations performed by an example embodiment of the access terminal AT such as shown in FIG. 2.

Figure 3A:
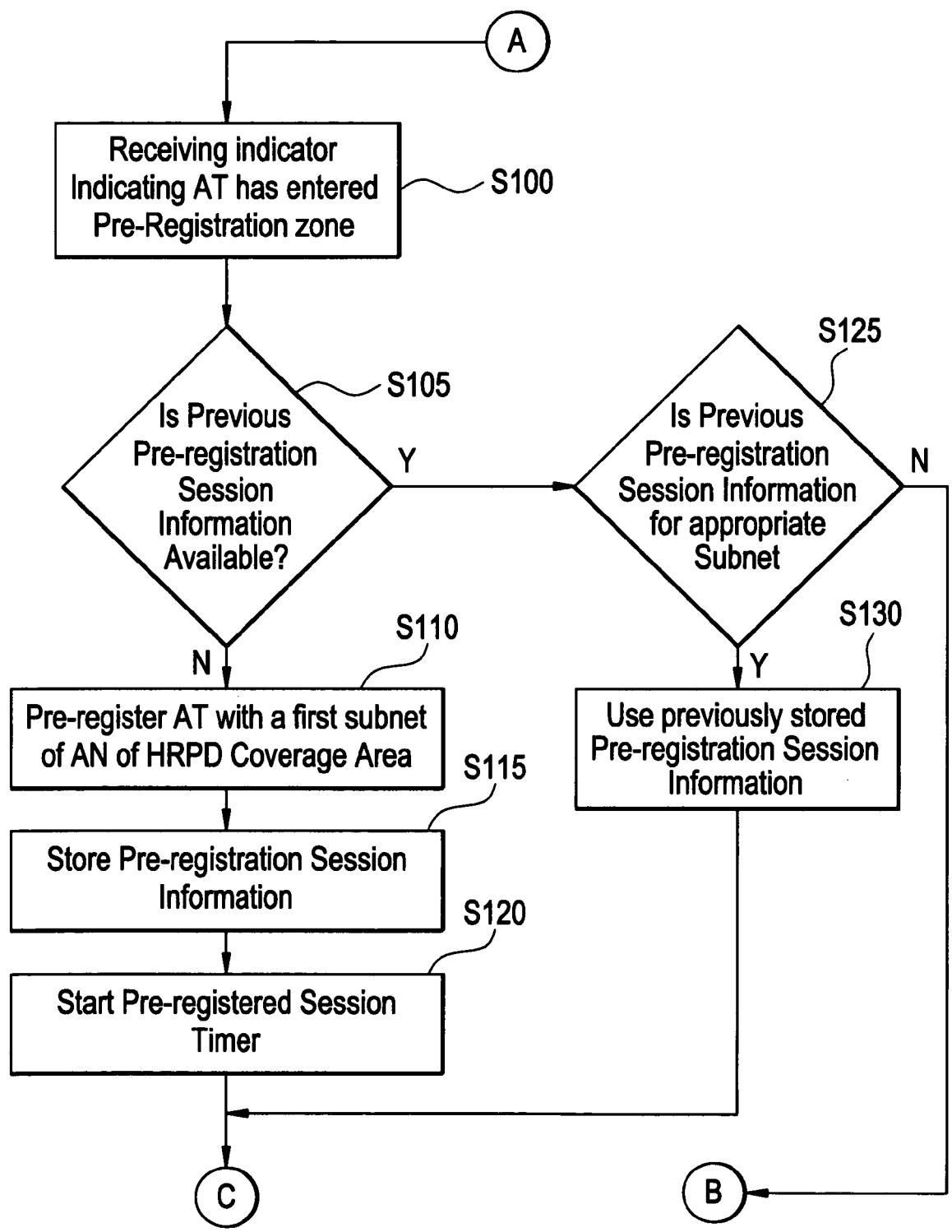
FIGS. 3A-3C illustrate a method performed by an access terminal according to an example embodiment of the present application.
Figure 3B:
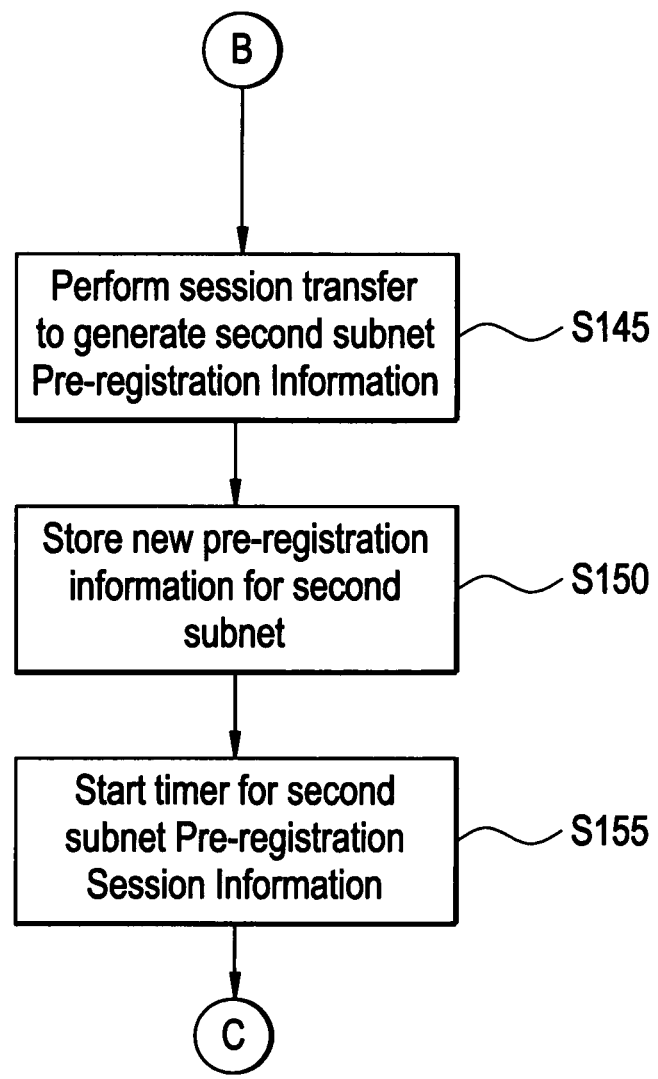
Figure 3C:
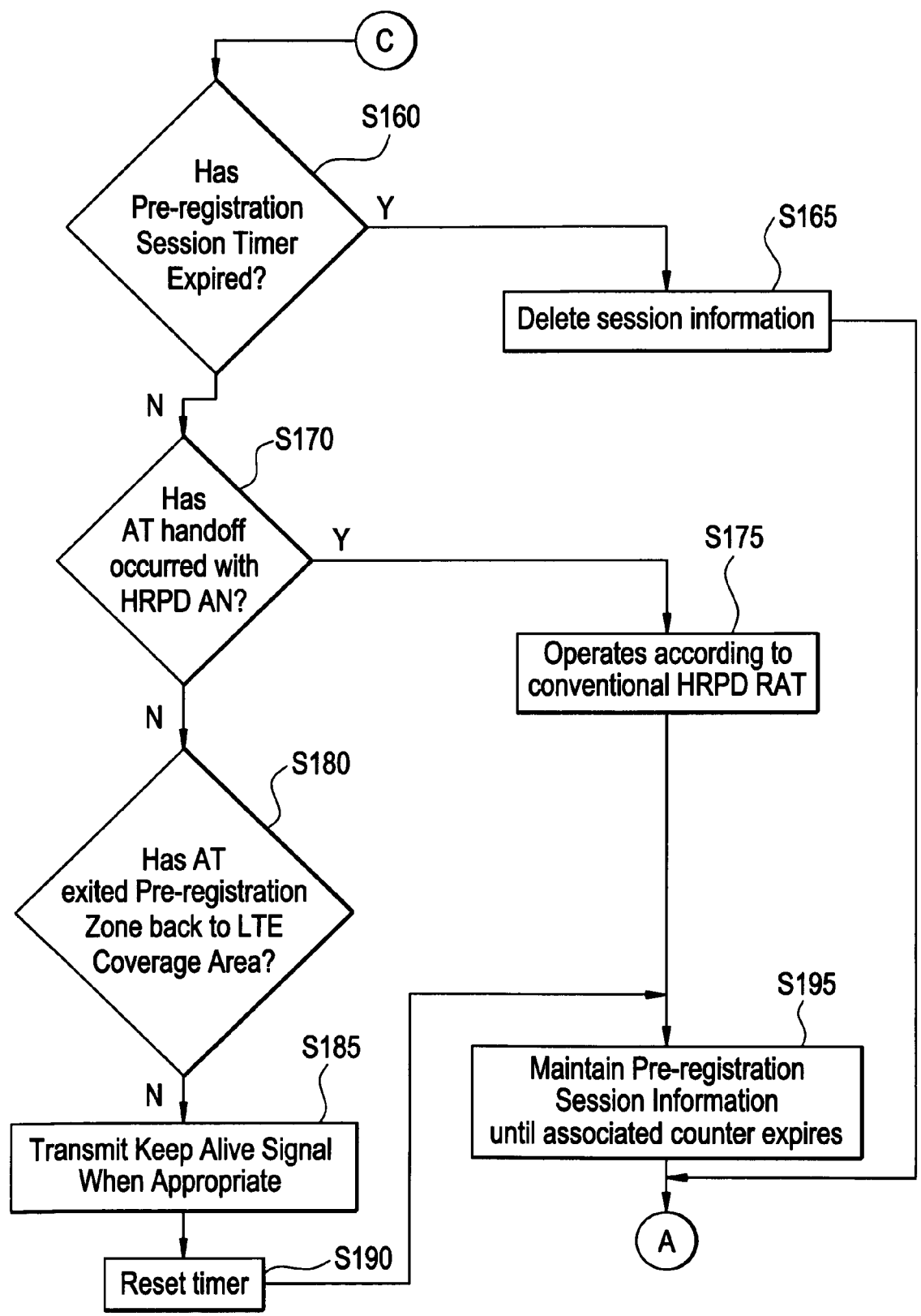

The flow chart illustrated in FIGS. 3A-3C represents an example embodiment of various methods and operations performed by an access terminal AT according to an example embodiment of the present application.

Referring to FIG. 3A, an access terminal AT receives an indicator from an access network indicating the access terminal AT has entered a pre-registration zone in step S100. This indicator may be received from one or more access networks of one or more different coverage areas. For example, referring back to FIG. 1, at Point A, the access terminal AT may receive a broadcast from one or more access networks of the LTE coverage area and/or one or more access networks of the HRPD coverage area. For example, one or more LTE access networks supporting cells arranged in the pre-registration zone periodically broadcast information including a border indicator. A transceiver 1400 of the access terminal AT will receive this border indicator, and the controller 1500 of an access terminal AT controls the access terminal AT accordingly as further explained below.

In response the transceiver 1400 of the access terminal AT does receive an indicator indicating the access terminal AT has entered a pre-registration zone, the controller 1500 of the access terminal AT determines if there is previous pre-registration session information available in the memory 1000 of the access terminal AT in step S105 of FIG. 3A.

Assuming, the access terminal AT, which received the border indicator, has not entered the pre-registration zone anytime recently (e.g., in about the previous six hours), or has never entered the pre-registration zone, pre-registration information will not be available in the memory 1000 of the access terminal AT. If no previous pre-registration session information is available to the access terminal AT, the access terminal AT begins a pre-registration process with an access network within the HRPD coverage area in step S110 of FIG. 3A. In step S110, the access terminal AT pre-registers with an access network of a subnet of the HRPD coverage area. The pre-registration process illustrated by step S110 in FIG. 3A, provides a set of pre-registration session information. As previously described with respect to FIG. 2, the pre-registration session information may include information relating to personalities supported by the pre-registration, session signature information, UATI, and a pre-registration session keep alive timer.

In step S115, the pre-registration session information created in step S110 is stored. For example, the pre-registration session information is stored in the memory 1000 of the access terminal AT.

According to an example embodiment, once the access terminal AT is pre-registered with a subnet of the HRPD coverage area, a pre-registration keep alive session timer is started as shown in step S120. The pre-registration keep alive timer is configured to determine how long the pre-registration session information is stored in the access terminal AT. It is noted that a corresponding pre-registration session keep alive timer is stored and operated by the access network HRPD AN as will be described later with respect to FIGS. 4A-4C. A pre-registered session timer 1157, 1257, 1357 of the access terminal AT may continuously count up and/or down until the pre-registered timer expires or is reset. For example, the duration of the pre-registered session timer may be 2 to 6 hours. After, the pre-registration keep alive timer is started in step S120, the example embodiment of the method illustrated in FIG. 3A proceeds to step S160 illustrated on FIG. 3C described later.

Referring back to step S105 of FIG. 3A, if pre-registration session information is available when the access terminal AT enters the pre-registration zone, the access terminal AT determines if the available pre-registration session information is related to the entered subnet of the HRPD coverage area in step S125. For example, at point B of FIG. 1, if the pre-registration session information previously stored at point A is still stored in the memory 1000 of the access terminal AT, this previously stored pre-registration session information is used by the access terminal AT within the pre-registration zone since the pre-registration session information stored at point A is related to the same subnet of the pre-registration zone that the access terminal is entering at point B. If the access terminal AT had entered the pre-registration zone during the past two hours and the keep alive timer associated with the previously-stored pre-registration session information is a six hour timer, the access terminal AT would have the pre-registered session information relating to this previous entrance to the pre-registration zone still stored in the memory 1000 of the access terminal AT. In this case, the controller 1500 causes the access terminal AT to not send a pre-registration or session transfer request and instead uses this previously stored pre-registration information rather than wasting time and resources involved with another pre-registration process and/or re-registration process as shown in step S130 of FIG. 3A. As shown in FIG. 3A, following step S130, the example embodiment of the method proceeds to step S160 shown in FIG. 3C and described later.

Referring back to step S125 of FIG. 3A, if the controller 1500 of the access terminal AT determines the previous pre-registration session information stored in the memory 1000 is not for the same subnet of the HRPD coverage area, the example embodiment of the method illustrated in FIG. 3A proceeds to step S145 shown in FIG. 3B.

Referring to FIG. 3B, a session transfer is performed in step S145 since the previously stored pre-registration session information was determined by the controller 1500 to be for a different subnet of the HRPD coverage area.

Figure 4A:
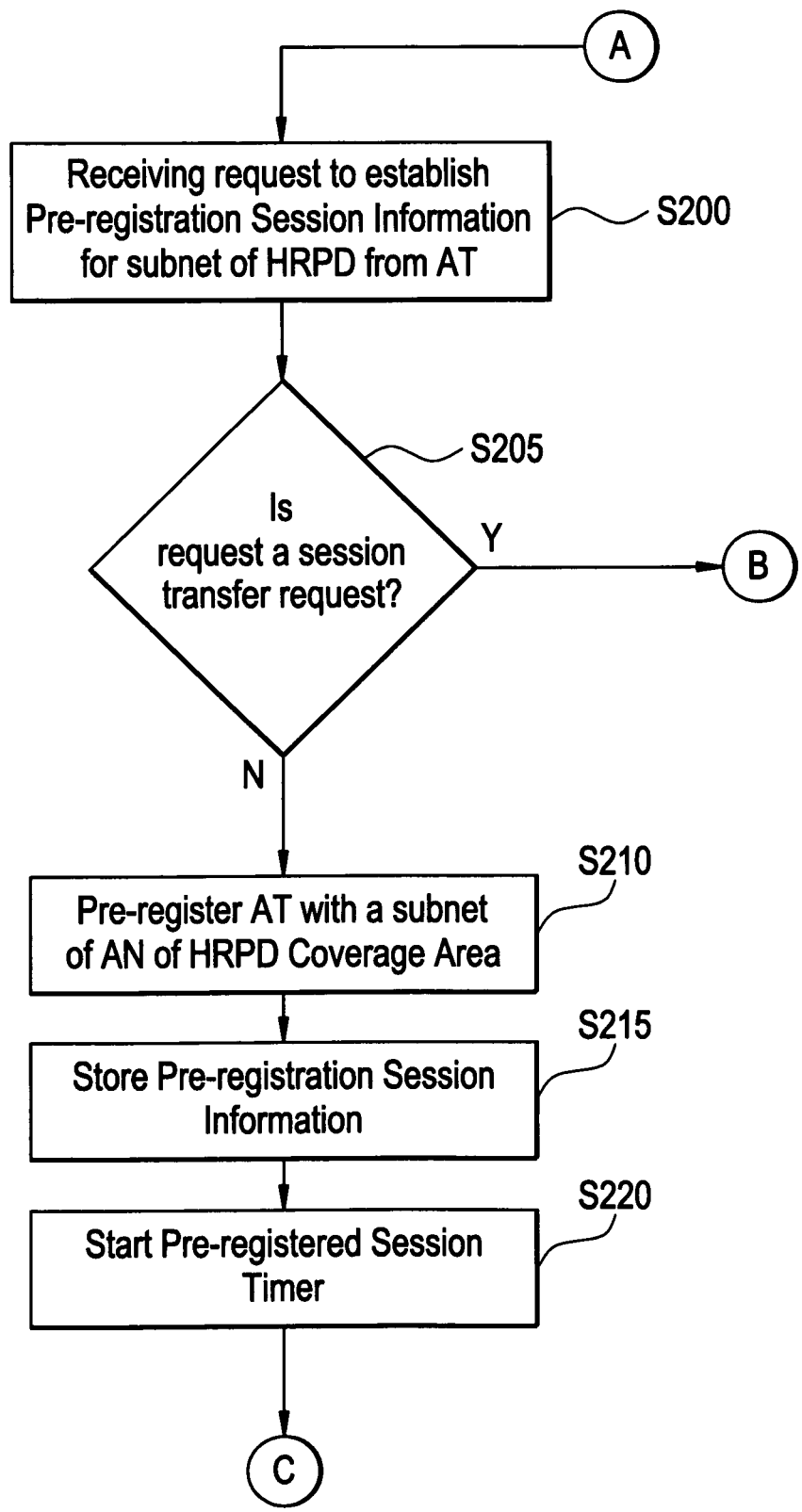

Once the session transfer is complete the new and/or modified set of pre-registered information for the new subnet of the pre-registration zone is stored in the memory 1000 of the access terminal AT as indicated by step S150 of FIG. 3B. Further, in step S155 a new pre-registration session timer will be started for the pre-registration information generated in step S145 and stored in step S155 in the access terminal according to the example embodiment illustrated in FIG. 3B. It is noted that when a timer is started in the access terminal AT, a corresponding timer is started in the HRPD AN. However, the example embodiment of the method illustrated in FIGS. 3A-3C relates to operations of the access terminal. FIGS. 4A-4C relate to example operations performed by the HRPD AN discussed later.

As described above with respect to FIG. 3B, steps S145 through steps S155 are performed if previously stored pre-registration information is available, but is determined to be associated with a different subnet of the HRPD coverage area. However, steps S145 through steps S155 will also be performed when an example embodiment of the access terminal is at point C of the example path shown in FIG. 1.

For example, in addition to monitoring for an indicator indicating the access terminal AT has entered the pre-registration zone, the access terminal also monitors broadcast information for indicators indicating the access terminal AT is entering or has entered a different subnet within the pre-registration zone. For example, as indicated by point C on the access terminal path of FIG. 1, if the access terminal is exiting the pre-registration zone of the second RAT subnet Subnet 2 and entering the pre-registration zone of the first RAT subnet, the access terminal AT will know the change based on a received indicator. In response to receiving this indicator indicating the access terminal AT is entering a new subnet of the pre-registration zone, the access terminal AT will request HRPD AN to perform a session transfer to generate second subnet pre-registration information. The pre-registered session with the second subnet of the pre-registration zone Subnet 2 will be transferred to the first subnet of the pre-registration zone Subnet 1. It is noted that the second subnet Subnet 2 may store the pre-registered session with the second subnet Subnet 2 until the session maintenance timer expires, which will eliminate the ping-pong problem and any unnecessary session transfer request through the air interface and the session transfers through the backhaul. In a conventional approach, when the pre-registered session has been transferred from the Subnet 2 Subnet, the previous session stored in Subnet 2 will be deleted immediately. To prevent ping-pong between the pre-registration zones associated with the Subnet 1 and Subnet 2, secondary pre-registration zone codes could be employed.

Referring to FIG. 3C, the access terminal AT determines if a pre-registration timer associated with pre-registration information has expired in step S160. As previously mentioned, each set of pre-registration information stored in the memory 1000 of the access terminal AT has an associated pre-registration timer. The information related to the pre-registration sessions is stored in the memory 1000 of the access terminal AT until a corresponding pre-registration session timer has expired. If in step S160, the access terminal AT determines a pre-registration timer has expired, the session information associated with the pre-registration session timer is deleted in step S165. If in step S160, a pre-registration timer is still counting and has not expired, the example embodiment of the method illustrated in FIGS. 3A-3C proceeds to step S170.

In step S170 the access terminal AT continues to monitor whether or not a handoff has occurred with an HRPD coverage area. For example, if the access terminal AT crosses the LTE/HRPD coverage boundary illustrated in FIG. 1, a handoff will occur and the access terminal AT will be supported by the HRPD coverage area only and not the LTE coverage area.

As shown in FIG. 3C, the access terminal being supported only by the HRPD coverage area after handoff operates consistent with the HRPD RAT as is well known in the art as shown by step S175. The details of the conventional operation of an access terminal AT while being supported by an HRPD RAT is well known and thus, the specifics of this operation will not be discussed herein for the sake of brevity.

Further, an access terminal AT also monitors whether or not the access terminal AT has exited a pre-registration zone back into an LTE coverage area as indicated in step S180 of FIG. 3C. If the access terminal AT stays in the pre-registration zone for an extended period of time and thus, does not exit the pre-registration zone by crossing the LTE/HRPD coverage area or the pre-registration triggering boundary, at predetermined time intervals, the access terminal AT will transmit a keep alive signal in step S185 of FIG. 3C. The transmitted keep alive signal indicates to an access network that a timer associated with the pre-registration session information should be restarted and maintained since the access terminal AT is still in the pre-registration zone. For example, a keep alive signal may be transmitted every two hours by the transceiver 1400 of the access terminal AT if the access terminal remains in the pre-registration zone. Further, in step S190 the access terminal AT resets a timer associated with the pre-registration session information each time a keep alive signal is transmitted to an access network. Step S195 of FIG. 3C merely reinforces the principle that pre-registration session information will be stored in the memory 1000 until a corresponding timer expires. However, according to an example embodiment in which the memory 1000 of the access terminal is capable of storing only a predefined number of sets of pre-registration information, there is an exception. If the memory 1000 has reached the predefined number of sets of pre-registration information and a new set of pre-registration session information is negotiated during a pre-registration or a session transfer is performed resulting in a new pre-registration session information, an oldest one of the plurality of pre-registration session information and corresponding timer is replaced with the newly transferred or negotiated pre-registration session information and newly started timer. As such, the memory 1000 operates as a FIFO memory if storage is limited.

The flow chart illustrated in FIGS. 4A-4C represents an example embodiment of various methods and operations performed by a HRPD AN according to an example embodiment of the present application.

Referring to FIG. 4A, the HRPD AN monitors whether a request to establish pre-registration session information for a subnet of the HRPD has been received from an access terminal AT. For example, the controller 400 of the HRPD AN monitors if a request is received by transceiver 500 of the HRPD AN. In step S200 of FIG. 4A, the HRPD AN receives a request to establish pre-registration session information for a subnet of the HRPD from an access terminal AT a pre-registration request from the access terminal AT.

In response to receiving a request from the access terminal AT, the HRPD AN determines if the request is a session transfer request in step S205. If the request is a session transfer request previously stored pre-registration information is stored in one of the memories 150, 250, 350 of the HRPD AN for the access terminal AT in step S205 of FIG. 4A. However, this previously stored pre-registration information is related to a subnet that is different from the requested subnet of the HRPD coverage area. A session transfer request may include a UATI associated with the previously stored pre-registration information and may be identified by the HRPD AN using techniques well-known in the art. If in step S205, the controller 400 of the HRPD AN determines the request received in step S200 is a session transfer request, the method of FIGS. 4A-4C proceeds to step S245 shown in FIG. 4A. Alternatively, if in step S205, the controller 400 of the HRPD AN determines the request is not a session transfer request the method illustrated in FIGS. 4A-4C proceeds to step S210. Assuming, the access terminal AT has not entered the pre-registration zone anytime recently (e.g., in about the previous six hours), or has never entered the pre-registration zone, the request will likely not be a session transfer request because pre-registration information will not be available in one of the memories 150, 250, 350 of the HRPD AN.

Still referring to FIG. 4A, the HRPD AN begins a pre-registration process with the access terminal AT in step S210. For example, the controller 400 of the HRPD AN will instruct the transceiver 500 of the HRPD AN to transmit and receive information to complete the pre-registration process.

Once the pre-registration process is completed, the HRPD AN stores the pre-registration session information in step S215. For example, controller 400 of the HRPD AN stores the pre-registration session information in one of the memories 150, 250, 350 of the HRPD AN. As previously described with respect to FIG. 2, the pre-registration session information may include information relating to personalities supported by the pre-registration, session signature information, UATI, and a pre-registration session keep alive timer.

According to an example embodiment, once the access terminal AT is pre-registered with an HRPD coverage area, the HRPD AN starts a pre-registration keep alive session timer as shown in step S220 of FIG. 4A. For example, controller 400 of the HRPD AN instructs the keep alive timer to begin counting. The pre-registration keep alive timer is configured to determine how long the pre-registration session information is stored in one of the memories 150, 250, 350 of the HRPD AN. For example, the duration of the pre-registered session timer may be 2 to 6 hours.

Referring to FIG. 4B, a session transfer is performed in step S245 since the request received in step S200 was determined to be a session transfer request in step S205. Once the session transfer is complete, the new and/or modified set of pre-registered information for the new and/or modified set of the pre-registered information is stored in a memory 150, 250, 350 of the HRPD AN as indicated by step S250 of FIG. 4B. Further, in step S255 a new pre-registration session timer will be started for the new and/or modified set of pre-registration information obtained in step S245 and stored in step S255 in the HRPD AN according to the example embodiment illustrated in FIG. 4B.

As described above with respect to FIG. 4B, steps S245 through steps S255 are performed if previously stored pre-registration information is available, but is determined to be associated with a different subnet of the HRPD coverage area. However, steps S245 through steps S255 will also be performed when the access terminal is at point C of the example path shown in FIG. 1, for example.

Referring to FIG. 4C, the HRPD AN determines if a timer associated with one of the plurality of pre-registration information stored in one of the memories 150, 250, 350 has expired in step S260. If in step S260, the controller 400 determines a pre-registration timer has expired, the session information associated with the pre-registration session timer is deleted in step S265. If in step S260, a pre-registration timer is still counting and has not expired. The example embodiment of the method illustrated in FIGS. 4A-4C proceeds to step S270.

In step S270, the HRPD AN continues to monitor whether or not a handoff has occurred with the access terminal AT. For example, if the access terminal AT crosses the LTE/HRPD coverage boundary illustrated in FIG. 1, a handoff will occur and the access terminal AT will be supported by the HRPD access network of the HRPD coverage area and the access terminal will no longer be supported by an access network of the LTE coverage area. As shown in FIG. 4C, the HRPD AN supports the access terminal AT consistently with the HRPD RAT in step S275.

As mentioned previously with respect to FIG. 3C, if the access terminal AT stays in the pre-registration zone for an extended period of time and thus, does not exit the pre-registration zone by crossing the LTE/HRPD coverage area or the pre-registration triggering boundary, at predetermined time intervals, the access terminal AT transmits a keep alive signal to the HRPD AN. In step S280 of FIG. 4C, the HRPD AN determines if a keep alive signal has been received from an access terminal AT. In response to receiving a transmit keep alive signal, the controller 400 of the HRPD AN causes a timer associated with the pre-registration session information to be reset in step S285 since the access terminal AT is still in the pre-registration zone as indicated by step S280. Lastly, step S290 emphasizes that pre-registration session information is maintained in one of the memories 150, 250 and 350 of the HRPD AN until an associated counter expires. As previously indicated, a counter may expire if a keep alive signal is not received, and the pre-registration session information has not been used for an extended period of time such as 2 to 6 hours, for example.

FIGS. 3A-4C described above involve signaling and message exchanges used to perform pre-registration, storing of pre-registration session information and session transfer in a wireless communication system. According to example embodiments, the signaling and message exchanges between an access network of the second coverage area and the access terminal are tunneled through the RAT of the first coverage area. For example, the signaling and message exchanges between the HRPD AN and the access terminal are tunneled through an LTE RTE.

Further, according to example embodiments detailed above and explained with respect to FIGS. 2-4C, unnecessary pre-registrations and re-registrations are avoided. In particular, according to example embodiments an access terminal AT would not need to re-register at points B and D on the access terminal path of FIG. 1. Thus, the cost and network resources consumed by the pre-registration or re-registration of a conventional access terminal is saved according to example embodiments.

Example embodiments being thus described, it will be obvious that the same way be varied in many ways. Such variations are not to be regarded as a departure from the example embodiments, and all such modifications are intended to be included within the scope.

I claim:

1. A wireless communication method, the method comprising:

obtaining, over a backhaul tunnel established between a first access network associated with a first coverage area supporting a first radio access technology (RAT) and a second access network associated with a second coverage area supporting a second RAT that is different from the first RAT, pre-registration session information that includes network parameters used to establish a pre-registered session with the second access network associated with the second coverage area if an access terminal in the first coverage area supporting the first RAT receives a border signal from an access network in the first coverage area supporting the first RAT, the border signal indicating that the access terminal has moved into a portion of the first coverage area defined as a pre-registration zone for the second coverage area supporting the second RAT and pre-registration session information associated with the second coverage area is unavailable in the access terminal, the second coverage area bordering the first coverage area;

starting a pre-registration session information timer associated with the obtained pre-registration session information; and storing the obtained pre-registration session information until the pre-registration information timer associated with the obtained pre-registration information expires.

2. The method of claim 1, further comprising:
deleting the obtained pre-registration session information if the pre-registration information timer associated with the obtained pre-registration information expires.

3. The method of claim 1, further comprising:
receiving a border indicator from an access network indicating the access terminal has entered the pre-registration zone; and determining if previously stored pre-registration session information associated with the second coverage area is available in the access terminal, wherein the obtaining step, reuses the previously stored pre-registration session information to communicate with the access network if the determining step determines that the previously stored pre-registration session information associated with the second coverage area is available, and obtains the pre-registration session information by pre-registering with the access network to negotiate the pre-registration session information if the determining step determines that the previously stored pre-registration session information associated with the second coverage area is unavailable.

4. The method of claim 1, further comprising:
sending a session transfer request to an access network indicating the access terminal is moving into the pre-registration zone of a second subnet of the second coverage area if the only pre-registered session information stored in the access terminal is pre-registered session information associated with a first subnet of the access network;

converting the obtained pre-registration session information associated with the first subnet to pre-registration session information associated with the second subnet; and starting a new pre-registration information timer associated with the pre-registration session information associated with the second subnet.

5. The method of claim 1, further comprising:
periodically transmitting a keep alive signal from the access terminal to the second access network via an air interface between the access terminal and the first access network and then through the backhaul tunnel to the second access network, if the access terminal stays in the pre-registration zone for a time duration;

re-starting the pre-registration session information timer associated with the pre-registration session information each time a keep alive signal is transmitted to the access network.

6. The method of claim 1, further comprising:
receiving a request from the access terminal requesting the pre-registration session information associated with the second coverage area; and determining if the request is a session transfer request, wherein the obtaining step converts previously-stored pre-registration session information associated with a first subnet to pre-registration session information associated with a second subnet and starts a new timer associated with the pre-registration information associated with the second subnet if the determining step determines that the request is a session transfer request, and pre-registering the access terminal to negotiate the pre-registration session information if the determining step determines that the request is not a session transfer request.

7. The method of claim 1, further comprising:
receiving a keep alive signal from the access terminal;
re-starting the pre-registration session information timer associated with the access terminal each time a keep alive signal is received from the access terminal.

8. The method of claim 1, wherein at least a portion of signaling and messaging exchanges between an access network of the second coverage area and the access terminal are tunneled through a radio access technology (RAT) area of the first coverage area.

9. An access terminal comprising:
a transceiver configured to communicate with a first access network of a first coverage area supporting a first radio access technology (RAT) and a second access network of a second coverage area supporting a second RAT that is different from the first RAT;
a memory configured to store a plurality of pre-registration session information and a plurality of timers, each of the plurality of timers being associated with a corresponding one of the plurality of pre-registration session information stored in the memory, each of the pre-registration session information includes network parameters used to establish a pre-registered session with the second access network supporting the second RAT prior to a possible handoff from the first access network supporting the first RAT to the second access network;
a controller configured to,
control operations of the access terminal, and
obtain pre-registration session information, through a backhaul tunnel established between the first access network of the first coverage area and the second access network of the second coverage area, associated with the second coverage area if the access terminal receives a broadcast from an access network in the first coverage area supporting the first RAT and pre-registration session information associated with the second coverage area is unavailable to the access terminal, the broadcast indicating that the access terminal has entered a pre-registration zone for a second coverage area, the pre-registration zone for the second coverage area being a portion of the first coverage area bordering a border of the first coverage area and the second coverage area.

10. The access terminal of claim 9, wherein the controller is configured to obtain the pre-registration session information if the receiver receives broadcast information including a border indicator, starts the timer associated with the obtained pre-registration session information, and instructs the memory to store the obtained pre-registration session information until the timer expires.

11. The access terminal of claim 9, wherein the controller is configured to convert previously-stored pre-registration session information associated with a first subnet of the second coverage area to pre-registration session information of a second subnet of the second coverage area in response to the receiver receiving a different subnet indicator indicating the access terminal is moving from a first subnet into a second subnet, and start a timer associated with the pre-registration session information associated with the converted pre-registration session information.

12. The access terminal of claim 9, wherein the controller is configured to delete the pre-registration session information if the timer associated with the pre-registration session information expires.

13. The access ter urinal of claim 9, wherein the controller is configured to,
instruct the transceiver to periodically transmit a keep alive signal from the access terminal to the second access network via an air interface between the access terminal and the first access network and then through the backhaul tunnel to the second access network, if the access terminal stays in the pre-registration zone for the second coverage area for a time duration, and
re-start the timer associated with pre-registration session information currently being used by the access terminal to communicate with the second access network.

14. The access terminal of claim 9, wherein the memory is configured to store a number of the plurality of pre-registered session information, and if the number is exceeded, an oldest of the plurality of pre-registration session information and the timer associated with the oldest of the plurality of pre-registration session information is replaced with a newly transferred or negotiated plurality of pre-registration session information and newly started timer corresponding to the newly transferred or negotiated plurality of pre-registration information.

15. The access terminal of claim 9, wherein at least a portion of signaling and messaging exchanges between the second access network of the second coverage area and the transceiver of the access terminal are tunneled through a radio access technology of the first coverage area.

16. An access network comprising:
a transceiver configured to communicate, over a pre-registered session, with at least one access terminal that is currently being supported by a second access network supporting a different radio access technology (RAT) from the access network;
at least one memory configured to store a plurality of pre-registration session information associated with the access terminal and a plurality of timers, each of the plurality of timers being associated with a corresponding one of the plurality of pre-registration session information stored in the at least one memory, each of the plurality of pre-registration session information includes network parameters used to establish the pre-registered session with the access terminal prior to a possible handoff of the access terminal to the access network; and
a controller configured to,
control operation of the access network, and
obtain the pre-registration session information, through a backhaul tunnel established between the access network and the second access network, associated with the access terminal, if the pre-registration session information associated with the access terminal is unavailable to the access network and the access network receives a request from the access terminal in response to the access terminal receiving a border signal from the second access network, the border signal indicating that the access terminal has moved into a portion of a coverage area defined as a pre-registration zone.

17. The access network of claim 16, wherein
the transceiver is configured to receive the request from the access terminal, and
the controller is configured to obtain the pre-registration session information associated with the access terminal and start a timer associated with the obtained pre-registration session information if the pre-registration session information associated with the access terminal is unavailable to the access network.

18. The access network of claim 17, wherein the controller is configured to,
determine if the request is a session transfer request, and
obtain the pre-registration session information by converting and transferring previous pre-registration session information residing at a first subnet to a second subnet and start a new timer associated with the converted and transferred pre-registration session information associated with the second subnet if the request is determined to be a session transfer request, and
pre-register the access terminal to negotiate the pre-registration session information if the request is determined not to be a session transfer request and pre-registration session information associated with the access terminal is unavailable to the access network.

19. The access network of claim 16, wherein the controller is configured to instruct the at least one memory to delete the pre-registration session information associated with the access terminal if the corresponding timer expires.

20. The access network of claim 16, wherein the controller is configured to restart the timer associated with the obtained pre-registration information currently being used to communicate with the access terminal in response to the transceiver receiving a keep alive signal from the access terminal, the keep alive signal being sent from the access terminal to the access network via an air interface between the access terminal and the second access network and then through the backhaul tunnel to the access network.

21. The method of claim 1, further comprising:
receiving the border signal indicating that the access terminal being supported by the first coverage area has entered the pre-registration zone of the second coverage area.

* * * * *